United States Patent [19]
Palazzetti et al.

[11] Patent Number: 5,515,281
[45] Date of Patent: May 7, 1996

[54] PROCESS AND SYSTEM FOR DETECTING MISFIRING IN INTERNAL COMBUSTION ENGINES

[75] Inventors: Mario Palazzetti; Cesare Ponti, both of Avigliana; Luigi Di Leo, Venaria Reale, all of Italy

[73] Assignee: Centro Richerche Fiat Societa' sortile Per Azioni, Turin, Italy

[21] Appl. No.: 285,358

[22] Filed: Aug. 3, 1994

[30] Foreign Application Priority Data

Aug. 4, 1993 [IT] Italy .................. TO93A0581

[51] Int. Cl.$^6$ .................................................. G01M 15/00
[52] U.S. Cl. .................... 364/431.08; 73/117.3; 123/419
[58] Field of Search .............. 364/431.03, 431.08, 364/431.05, 431.06; 73/116, 112, 117.3; 123/419; 324/379

[56] References Cited

U.S. PATENT DOCUMENTS

| | | | |
|---|---|---|---|
| 4,550,595 | 11/1985 | Venema | 73/116 |
| 5,044,194 | 9/1991 | James et al. | 73/112 |
| 5,095,742 | 3/1992 | James et al. | 73/116 |
| 5,119,783 | 6/1992 | Komurasaki | 123/425 |
| 5,200,899 | 4/1993 | Ribbens et al. | 364/431.08 |
| 5,269,178 | 12/1993 | Vigmostad et al. | 73/116 |
| 5,278,760 | 1/1994 | Ribbens et al. | 364/424.1 |
| 5,287,735 | 2/1994 | Klauber et al. | 73/116 |

FOREIGN PATENT DOCUMENTS

| | | |
|---|---|---|
| 0442687 | 8/1991 | European Pat. Off. . |
| 0497475 | 8/1992 | European Pat. Off. . |
| 0553031 | 7/1993 | European Pat. Off. . |
| 4206118 | 9/1992 | Germany . |
| 4219135 | 12/1992 | Germany . |
| 2249839 | 5/1992 | United Kingdom . |
| WO91/11599 | 8/1991 | WIPO . |
| WO91/11601 | 8/1991 | WIPO . |
| WO92/10733 | 6/1992 | WIPO . |
| WO92/11522 | 7/1992 | WIPO . |

OTHER PUBLICATIONS

Patent Abstracts of Japan, vol. 7, No. 254 (M–255) (1399) Nov. 11, 1983 & JP-A-58 138 271 (Mitsubishi Jidosha Kogyo KK) Aug. 17, 1983.

Klenk, et al., "Misfire Detection by Evaluating Crankshaft Speed–A Means to Comply with OBDII", SAE International Congress, Mar. 1–5, 1993, pp. 1–9.

*Primary Examiner*—Kevin J. Teska
*Assistant Examiner*—Tan Nguyen
*Attorney, Agent, or Firm*—Edward D. Manzo; Ted K. Ringsred

[57] ABSTRACT

Starting from a sequence of values of indicated torque detected for each expected combustion in the engine a cycle signal is generated as a combination of at least two successive values of the said sequence. The peak value of the said cycle signal is then compared with a comparison threshold chosen preferably in proportion of the fuel injection duration into the cylinders. Misfires are identified preferably from the result of a comparison between the said peak value and the said comparison threshold which differs from the result of comparison in the presence of regular operation of the engine.

18 Claims, 7 Drawing Sheets

(o) → POSITIONS OF MISFIRES GENERATED
(↑) → POSITIONS OF MISFIRES DETECTED (o) → POSITIONS OF MISFIRES GENERATED (o) → POSITIONS OF MISFIRES GENERATED
(↑) → POSITIONS OF MISFIRES DETECTED (o) → POSITIONS OF MISFIRES GENERATED
(↑) → POSITIONS OF MISFIRES DETECTED (o) → POSITIONS OF MISFIRES GENERATED
(↑) → POSITIONS OF MISFIRES DETECTED (o) → POSITIONS OF MISFIRES GENERATED
(↑) → POSITIONS OF MISFIRES DETECTED (o) → POSITIONS OF MISFIRES GENERATED

PROCESS AND SYSTEM FOR DETECTING MISFIRING IN INTERNAL COMBUSTION ENGINES

FIELD OF THE INVENTION

The present invention relates in general to the problem of detecting loss of combustion ("misfires" or "misfiring") in the operation of an internal combustion engine, for example in internal combustion engines mounted on motor vehicles such as motor cars.

The term loss of combustion (or misfire) indicates an anomalous situation in the normal operation of the engine.

The air-petrol mixture introduced into the cylinder does not generate the normal chemical reaction of a combustion engine, but is expelled completely or partially unburnt into the exhaust. As an immediate effect this generates an instantaneous loss of engine torque.

The unburnt mixture arrives at the exhaust where it burns causing an increase in the temperature of the silencer.

In the case of engines having catalytic converters in their silencers this increase in heating is the main cause of damage to the catalyser Misfires can arise following:

malfunctioning of an injector loss of spark from a spark plug mixture too lean or too rich.

Misfires can cause more or less damage according to the timing and number of misfires which occur.

For example, a misfire generated with the engine at full power is more serious than one at partial power, and a train of misfires (a series of consecutive combustion losses) is more damaging than a number of single and isolated misfires.

The increasing sensitivity to the problems of protection of the environment leads, as is known, to the definition of ever more stringent regulations in relation to the polluting emissions of internal combustion engines and to the phenomena attributed to such emissions. For example, the Californian CARB OBD-2 regulation, which will come into force in 1996 throughout the entire territory of the United States requires, among other things, detection of misfiring.

The identification of this anomaly will have to be indicated to the user by the activation of an alarm (warning light on the dashboard, which illuminates and cannot be extinguished). This function is intended to protect the catalytic converter in the silencer.

The application of the OBD-2 Regulation could cause serious inconvenience to the user who, at each operation of the alarm, could be constrained to go to a garage. On the other hand, if the engine is equipped with an automatic injection calibration system capable of maintaining it always perfectly centred, this significantly reduces the probability that the OBD-2 alarm will activate.

DESCRIPTION OF THE PRIOR ART

The most widely known methods for the diagnosis of misfiring are:

analysis of the signal representing the pressure in the combustion chamber (in the presence of misfiring a very much smaller pressure peak is recorded than in normal operation);

analysis of the light emission generated by the combustion of the air-petrol mixture.

In earlier European Patent Application EP-A-0 408 518 there has been described the possibility of correlating the occurrence of combustion loss phenomena (deriving from an excessive weakening of the air/fuel mixture) to the torque developed by each cylinder, for example by utilising the speed of rotation of the crank shaft as an input.

As far as this is concerned this earlier European patent application fits into the main thread of research documented by Italian patents 1 155 709, 1 180 045, 1 188 153, 1 219 341 and 1 203 578 which describe the operating criteria for a dynamic torque-measuring apparatus (MDC), that is to say a device which, in the case of a heat engine, taken here as an exemplary application, directly provides:

i) the variation of the useful torque Cu as a function of the speed of rotation by means of a test during rapid acceleration;

ii) the variation of the resistant torque Cr as a function of the speed of rotation; by means of a test during deceleration with the ignition of a petrol engine turned off and with the fuel of a diesel engine switched off, The principle utilised for the operation of the dynamic torque measuring apparatus (a principle to which the present invention also will relate) is based on the equation for dynamic equilibrium of the torque acting on a rotating mass.

In the case of a heat engine two cases can be distinguished corresponding to the two types of test just described:

1 in acceleration, when the generated torque Ci, the resistant torque Cr and the inertial torque $I * \omega_{acc}$, all act, the equation for dynamic equilibrium:

$$Cu=Ci-Cr=I*\dot\omega_{acc}$$

shows that from the measurement of $\omega_{acc}$ it is possible to get back immediately to Cu.

2 in deceleration, with the motor turned off, when the resistant torque Cr and the inertial torque $I * \omega_{dec}$ act, the equation of dynamic equilibrium:

$$Cr=I*\dot\omega_{dec}$$

shows that from the measurement of $\omega_{dec}$ it is possible to get back immediately to Cr. Therefore the problem is that of measuring the acceleration.

The rotation signal provided by a phonic wheel or by an encoder is processed and differentiated to obtain the velocity and acceleration information. The two signals ω and ω are respectively applied to the x and y inputs of a sufficiently fast plotter, which draws the two characteristics of useful torque and resistant torque in real time. It is to be noted that from the diagram produced by the dynamic torque measurement apparatus in the manner described it is possible to obtain, by rapid detections or calculations, several other quantities characteristic of the mechanism under test:

the torque, indicated Ci, obtainable of the sum of Cu and Cr;

the organic yield "uMDC" according to the expression:

$$uMDC=Cu/(Cu+Cr)$$

immediately calculable by using the ratio between the vertical segment of the diagram which represents Cu and that which represents the distance between the two characteristics Cu and Cr;

the useful power $Pu=Cu * \omega$ obtainable by using the product of the ordinate and the corresponding abscissa;

the power, indicated $Pi=Ci * \omega$ obtainable by using the product of Cu+Cr and the corresponding abscissa.

The dynamic measurement of torque applied to reciprocating engines opens a series of possibilities for analysis which corresponds to different apparatus.

To define briefly the characteristics of this family of detectors it is convenient to review the basic theory of dynamic measurement apparatus by utilising images from the description of the phenomena by means of the theorem of kinetic energy rather than the first law of dynamics.

We consider an engine in free acceleration. It is characterised by a moment of inertia I and by an angular velocity $\omega$.

If we call the kinetic energy E and use A for the angle lying between two points (n, n–1) between which we measure the kinetic energy, and finally if we indicate the drive torque with C, we can write that the work done in the angle A has a value A * C.

In the same way the difference in the kinetic energies at the ends of this angle has the same value, that is to say:

$$A*C = E_2 E_1 = \tfrac{1}{2}*I*(\omega_2^2 - \omega_1^2)$$

this signifies that for a certain mean angular velocity $\omega_m$, a certain angle and a certain moment of inertia, the torque is directly calculated by the difference in the measured velocity at the two points considered and that the work done in the angle A is measured by the product of the mean velocity for the moment of inertia, and the velocity increment.

The equations which govern the operation of the system described above are correct if referred to inertial axes. In fact, with pick ups fixed to the engine crankcase it is only possible to measure relative velocity between the flywheel and the crankcase, which introduces a systematic error into the detection. This error can be eliminated or contained but by different methods.

The vibrational noise due to the movement of the crankcase, induced by the engine itself, has a period 4π. Thus, by taking an angle of 4π as a basis for measurement of ω it is possible to cancel this disadvantage.

The elimination of the error due to vibrations is obtained by subtracting the resistant torque from the value of the useful torque for each cylinder.

The indicated torque, which is the most significant quantity since all the anomalies relating to combustion are related to it, is thus a reliable measurement.

For this, by calculating the resistant torque, which is free from vibrational error, one can, from the indicated torque for each cylinder, derive the useful torque with the vibrational error taken out.

The error due to imprecision in detection of magnetic references can be compensated using the same technique as previously explained.

The error, in fact, could be repeated in the same way both in acceleration and in deceleration and therefore the calculation of the indicated torque would eliminate it.

For a detailed description of the techniques for correction/ elimination of the errors and disturbances (perturbations) mentioned above (which can advantageously be utilised within the ambit of the present invention) reference can usefully be made to the description in Italian patent 1 180 045. This is particularly valid in the presence of possible differences in compression, which could alter the results and also for indicating a possible angular error in the positioning of the detection notches on the engine flywheel. This latter is due to small differences in the positioning of the notches (in this case four at 90° from one another) present on the flywheel fitted to the crank shaft. The angular error can be found by observing the variation of the resistant torque cylinder by cylinder, which is assumed to be symmetrical.

The disparity between the cylinders falls as the speed of the engine varies, thereby confirming the presence of a geometric dissimetry. By introducing suitable corrections into the calculation of the accelerations it is therefore possible to reduce the incidence of this error.

This correction makes it possible to obtain the minimum disparity between the torques of the four cylinders, thereby guaranteeing a greater precision in the measurement.

OBJECTS AND SUMMARY OF THE INVENTION

The present invention therefore has as its object the exploitation of a process and an improved system for detecting loss-of-combustion events (misfires) in internal combustion engines able to satisfy a set of requirements in an optimum way, among which can first be mentioned obtaining precise and reliable results and the possibility of implementation with simple processor means which allow the system to be mounted on board motor vehicles in particular motor cars in current production, as normal mass produced equipment.

According to the present invention this object is achieved by a process and a device having the characteristics set out in the following claims.

In summary, the invention is based on a recognition of the fact that the identification of algorithms for detecting misfires based on the methodology of dynamic torque measurement described hereinabove also allows diagnosis of misfiring to be safely made with the motor car in motion.

An important study has ascertained the influence of the conditions of use of the car on the signal measured by the dynamic measurement apparatus (the indicated torque) to which misfiring is related. If the motor is just operating in free acceleration (vehicle stationary and gear box in neutral) the moment of inertia (I) to be considered is that of the flywheel. If the propulsion unit is working normally (on the road) the moment of inertia which the system sees could depend on the coupling between the motor and the vehicle via the clutch.

In this connection experiments have been conducted in the following way:

several measurements were taken of the dynamic torque in free acceleration (vehicle stationary and gear box in neutral);

several detections were made in transit with the vehicle in movement on a flat road, with different gear ratios and engine conditions;

during each test at least one misfire was caused artificially;

the amplitude of the measured signal (indicated torque) for the cylinder which precedes that in which the misfire was generated was compared in the various test conditions.

Analysis of the results has made it apparent that the amplitude of the measured indicated torque signal, in the presence of a misfire, is independent of the working conditions of the vehicle (no-load or under load).

This indicates that the flywheel of the engine behaves as if the clutch were disconnected.

This conclusion was reached by comparing, for example in the case of a four cylinder engine, the indicated torque in cylinder number 2 measured, during each test, in the instant preceding the generation of the misfire in cylinder number 1.

In particular, measurements in free acceleration and the most significant measurements made on the road in second and fifth gear at mid and high engine revolutions were examined.

Processing of the data shows that the values of indicated torque on cylinder number 2 both under load and with no load coincide.

This is to say that the moment of inertia to be considered, for all operating conditions of the vehicle, is always the same.

This result has made it possible to look for an algorithm for detecting loss of combustion (misfires) independently of the conditions of use of the vehicle.

BRIEF DESCRIPTION OF THE DRAWINGS

The invention will now be described purely by way of non-limitative example, with reference to the attached drawings, in which:

FIGS. 2A to 15 illustrate, in diagrammatic form, various examples of embodiments of the process according to the invention.

DESCRIPTION OF THE PREFERRED EMBODIMENTS

Figure 1:
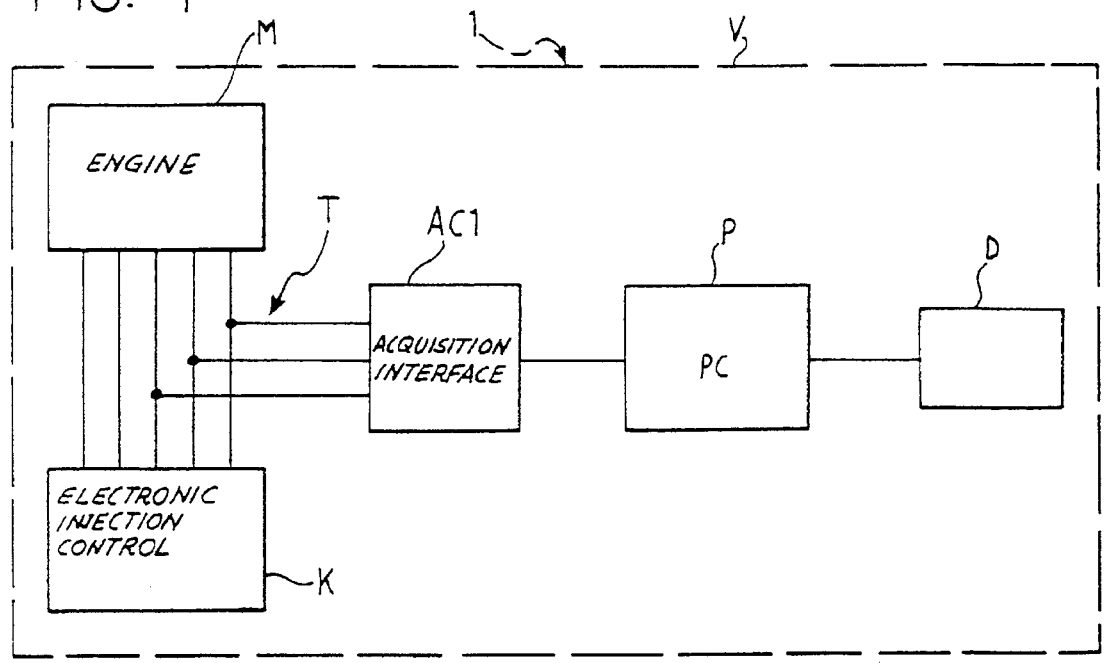
FIG. 1 illustrates in the form of a block diagram, the structure of a system for the detection of misfires in an internal combustion engine.
Figure 2A:
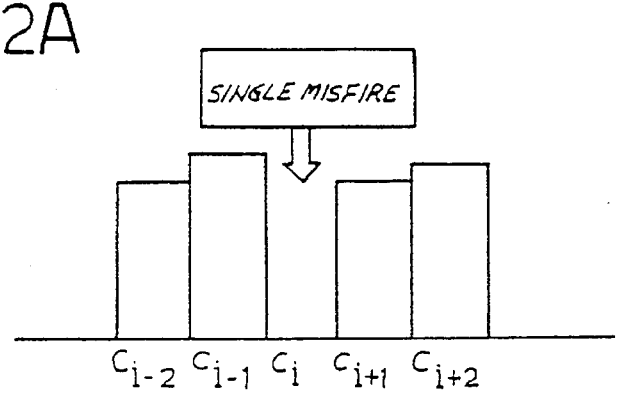
Figure 3:
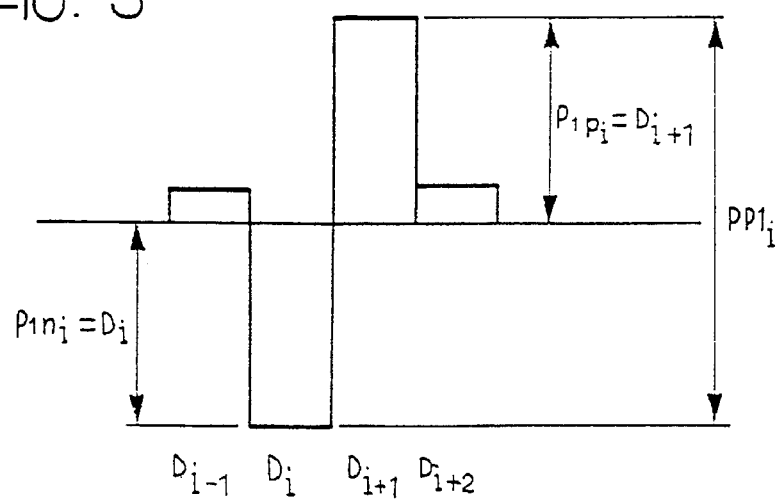

In FIG. 1 the reference numeral 1 generally indicates the system for detecting misfires which can be mounted on board a motor vehicle such as an automobile V.

The system is intended to be associated with an internal combustion engine M which drives the vehicle and the misfires of which are to be detected.

In the specific case the experimental data to which FIGS. 2A to 15 relate were derived from a vehicle V constituted by a Lancia Dedra 2000 CAT motor car equipped with electronic ignition and injection control unit K model JAW 04J (produced by Weber) by fitting to the existing electrical connections between this and the engine M a system of connection (for example an electrical T-shaped connector) indicated with the reference letter T, for taking off signals relating to the phase of the crankshaft (PHASE), to the top dead centre point (TDC) of the cylinders, and to the duration of fuel injection (ET) in the cylinders themselves. These signals are sent to a data acquisition card AC1 with a view to sending it via an RS232 interface line to a processor unit P such as a microprocessor or equivalent processor.

The processor unit is programmed (in a known way) so as to be able to generate the value of the indicated torque (C) relating to each cylinder starting from the information relating to the speed of rotation of the engine M.

All this is according to criteria widely known per se, which are those indicated hereinabove in relation to Italian patents 1 155 709, 1 180 045, 1 188 153, 1 219 341, 1 203 578 and in relation to European patent application EP-A-O 408 518. In particular, in the currently preferred embodiment, the indicated torque signal C is calculated according to criteria described in detail in Italian patent 1 180 045. Naturally, taking account of the fact that in the case of the present invention, the detection is made with the vehicle V under load (in traction) so that the indication of possible misfire phenomena (which is usually achieved by the effect of a display controlled by the unit P on a display D visible to the driver—typically a warning lamp or a similar indicator) is achieved in a continuous manner during the running of the vehicle.

In general, the processor unit P detects the indicated torque value for all the cylinders of the engine M, seen as a sequence of values $C_i$, where i identifies the general or $i^{th}$ real or missing combustion phenomenon. The processor unit P is therefore able (according to known criteria reducible to a programming thereof which can easily be put into effect by one skilled in the art) to perform manipulation operations, in particular to obtain the difference between the detected values of $C_i$ for different combustions.

In particular, in the embodiment of the invention currently preferred, the unit P is programmed in such a way as to be able to implement three different algorithms on the values $C_i$ (individually and/or in combination) defined as follows:

half-cycle algorithm double-cycle algorithm single-cycle algorithm

Half cycle algorithm

The procedure to follow in order to identify misfires requires:

processing velocity information in such a way as to derive the value of the indicated torque (C) relating to the cylinder under examination in the terms set out hereinabove;

reading the injection duration (ET) actuated by the central control unit, again on the same cylinder.

Therefore, the process according to the invention (in all its various embodiments illustrated here) makes it possible to detect the indicated torque value for each expected combustion (therefore both if the combustion has taken place and if it is missing) the indicated torque value thereby generating a sequence of values . . . , $C_i$, . . . .

The half-cycle recognition algorithm, which we will indicate $D_i$, utilises the difference between $C_i$ (relating to the "$i^{th}$" combustion) and $C_{i-1}$ (relating to the "(i–1)"th combustion):

$$D_i = C_i - C_{i-1}$$

The term half-cycle makes reference to the fact that comparisons are made of the torques measured on consecutive cylinders in order of firing, that is to say each half-revolution of the engine (or 180°) for a four cylinder engine.

In the event of a single misfire, FIG. 2 a) and b), $D_i$ has a negative peak followed immediately by a positive peak $D_{i+1}$.

The identification of an individual misfire requires, initially, the application of the half-cycle algorithm to calculate the peak-to-peak of the $PP1_i$ signal in the instant "i" (FIG. 3) which is equivalent to looking for the beginning and the end of the individual misfire:

$$P1n_i = C_i - C_{i-1} = D_i$$

$$P1p_i = C_{i+1} - C_i = D_{i+1}$$

$$PP1_i = P1p_i - P1n_i$$

where:

P1n=negative peak (beginning of misfire)

P1p=positive peak (end of misfire)

PP1=peak to peak of the half-cycle algorithm

After determination of the peak-to-peak of the signal $PP1_i$ it is necessary to define a comparison threshold which is essential for the identification of the individual misfire.

Figure 4A:
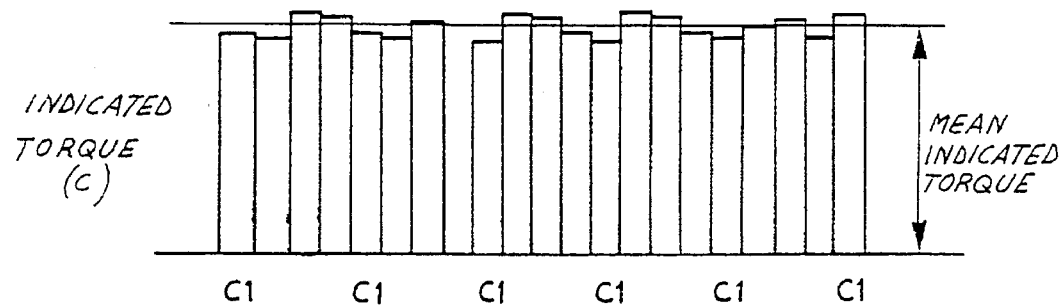
Figure 4B:
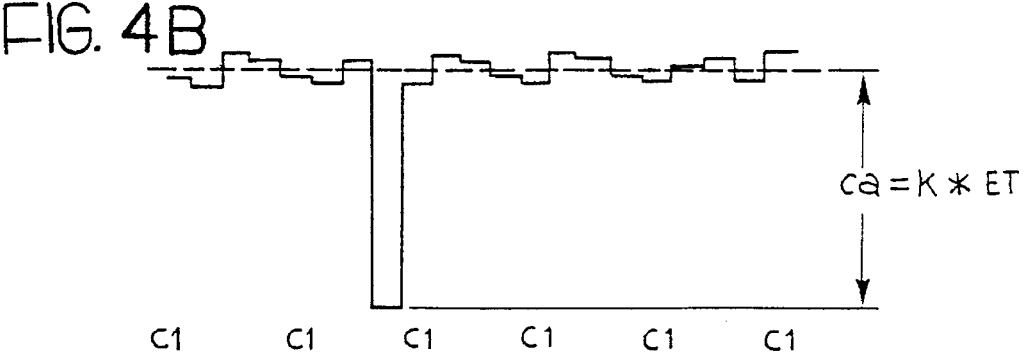

The comparison threshold must be related to the expected indicated torque (Ca) of FIG. 4b) which is proportional, to a good approximation, to the injection duration (ET), controlled at that instant by the central control unit:

$$Ca = K*ET$$

where:

K is calculable with good precision as the ratio between the maximum value of the mean indicated torque of the four cylinders (Cmax) of FIG. 4a) and the maximum duration of the injection time (ET max) with the motor at full power.

In practice changing the operating conditions of the engine will involve the variation of Ca.

It thus appears evident that the comparison threshold to be utilised for detection of individual misfires must be related to the expected torque and calculated as: comparison threshold=c * K * ET
where:

C=a coefficient which takes account of possible perturbations.

In the presence of a single misfire, if the concept of expected torque is applied to the half-cycle algorithm for the calculation of $PP1_i$, one gets that:

$$PP1_i = 2*K*ET_i$$

in fact, by considering $C_i=0$, one can say that:

$$c_{i+1} = K*ET_{i-1}$$

$$c_{i+1} = K*ET_{i+1}$$

consequently:

$$P1n_i = C_i - C_{i-1} = -K*ET_{i-1}$$

$$P1p_i = C_{i+1} - C_i = K*ET_{i+1}$$

for which if $ET_i = ET_{i+1}$, one obtains that:

$$PP1_i = K*ET_i - (-K*ET_i) = 2*K*ET_i$$

The identification of the individual misfire is determined by evaluating the difference between $PP1_i$ (dependent on the measured torque) and the comparison threshold (dependent on the expected torque):

$$PP1_i > c1*ET_i*K$$

where:

$ET_i$=the injection duration relating to the $i^{th}$ cylinder c1=a suitable value.

The algorithm identified for detecting the loss of combustion maintains its efficacy in all operating conditions of the engine in which $ET_i$ is greater than 0.

If, for example, we are in the presence of the CUT-OFF strategy (exclusion of the introduction of fuel when the accelerator peddle is released) with $ET_i=0$, the application of the half-cycle algorithm would cause the indication of a misfire which in reality does not exist.

To resolve this critical state it is necessary to perform a preliminary test on the injection duration $ET_i$, which prevents the application of the algorithm for detecting misfires. In practice, if:

$$ET_i < ETmin$$

where:

ETmin=the value of the injection duration relating to the slow running or slightly faster condition of the engine (in our case ETmin=4 ms was used)

the test on the half cycle algorithm does not have to be made.

This arrangement serves:

to avoid false recognitions when in CUT-OFF mode, in that a misfire indicated in this condition is indubitably an error;

to prevent the identification of misfires in those situations (such as, for example, slow running) in which the detection is of low significance.

The half-cycle algorithm has been extensively tested from an experimental point of view. The tests related to various situations of use of the vehicle:

flat or bumpy road in motion or choked at mid and high engine speeds with or without gear changes During all the tests a misfire was always caused in cylinder number 1 every five engine cycles.

The generation of these latter was effected with the same central control unit K with modified software. This "misfiring generator SW" makes it possible to define:

number of misfires to generate;

the cylinder(s) on which to act;

the instants in which to cause the misfires.

Figure 5:
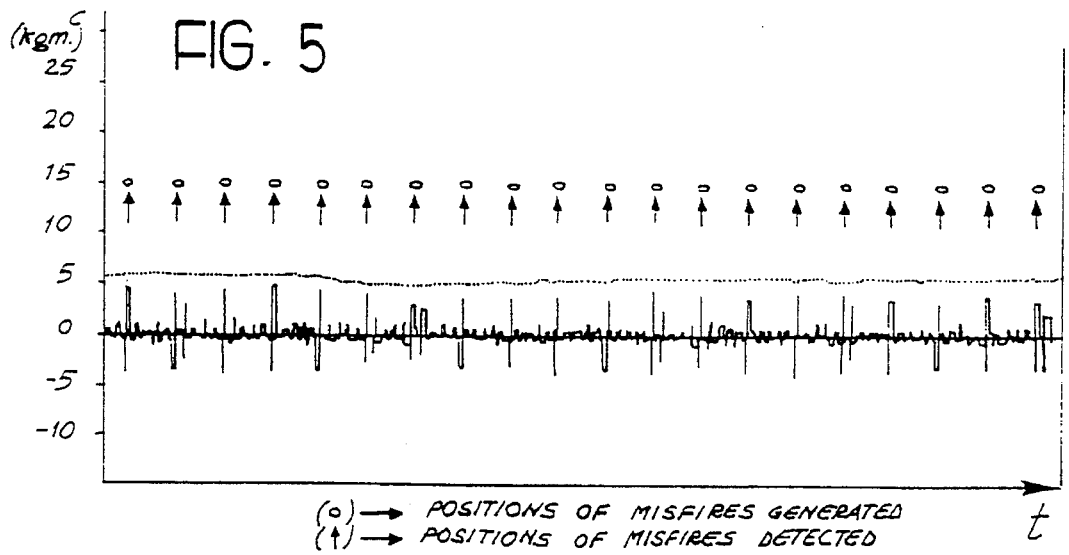
Figure 6:
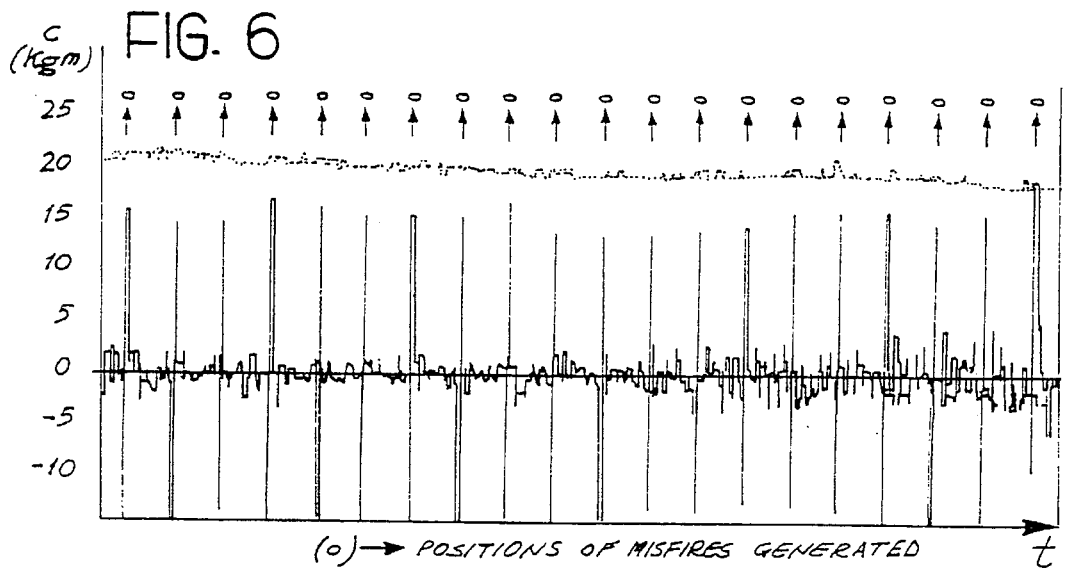
Figure 7:
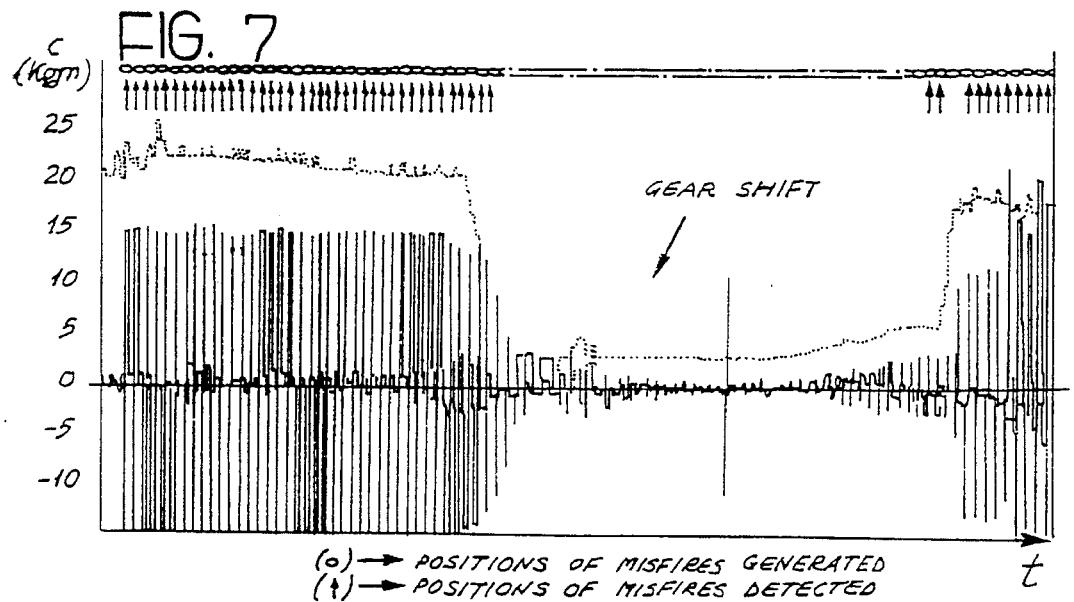
Figure 8A:
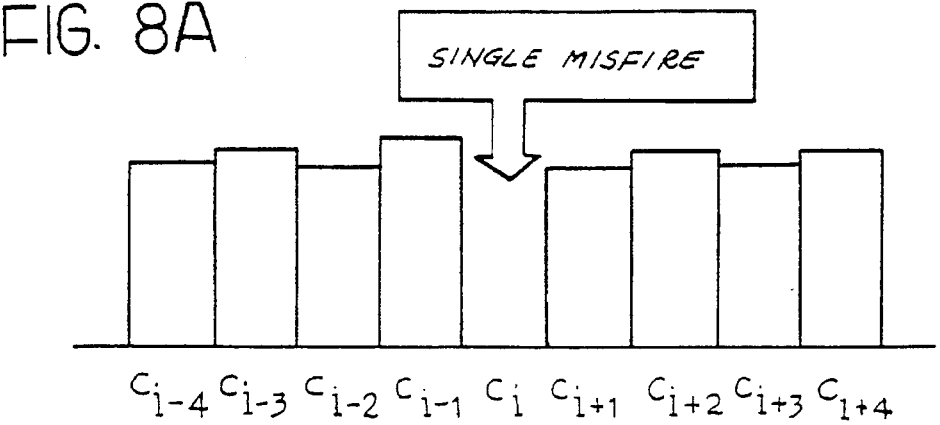
Figure 8B:
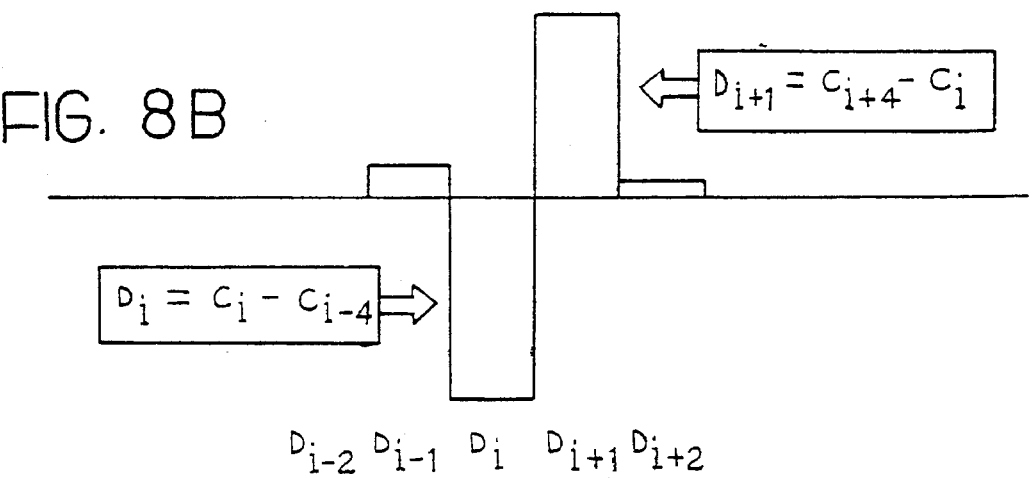
Figure 9:
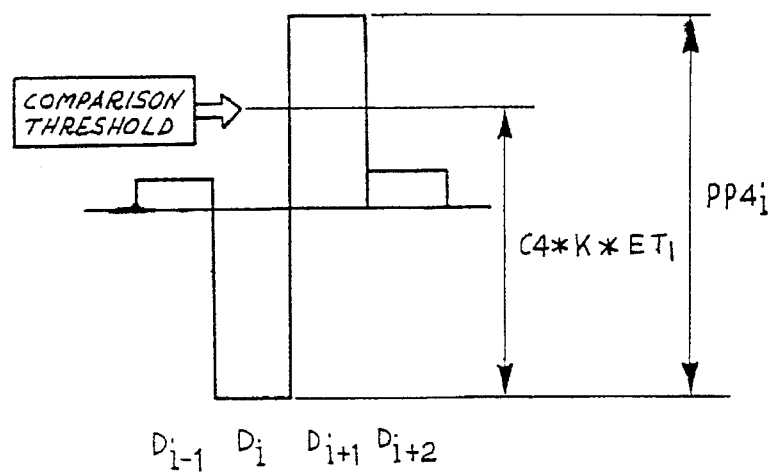
Figure 10:
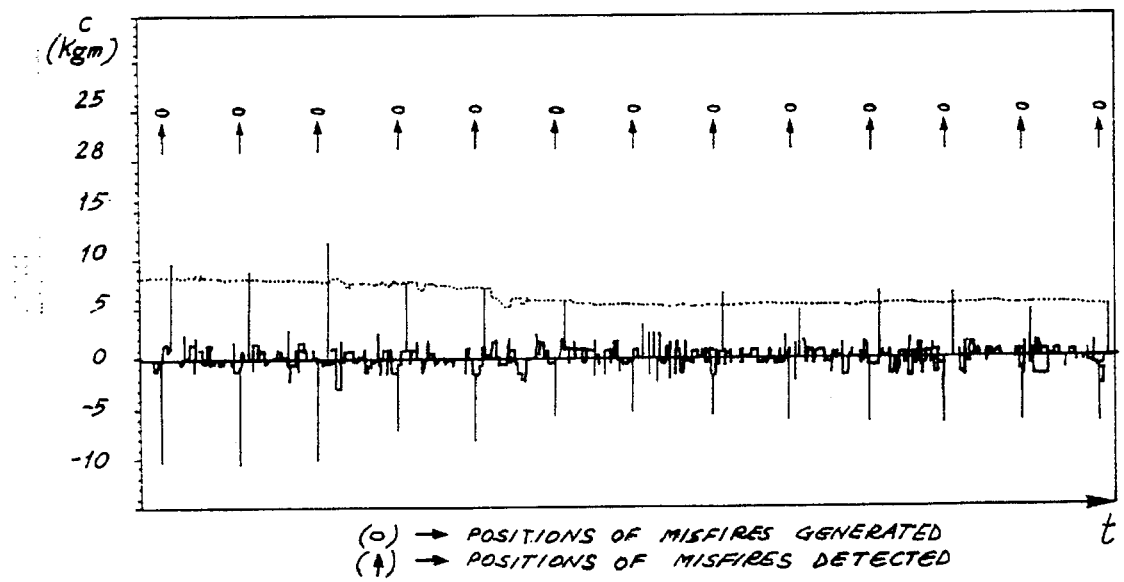

The tests conducted are illustrated by FIGS. 5 to 7 which show, as a function of time t (or of engine angle, which is equivalent):

half-cycle test result (shown in continuous dark line);

the comparison threshold (with continuous light line);

the position of the generated misfires (each of which is indicated with a circle);

the position of the misfires detected by the recognition algorithm (each identified misfire is represented by an arrow).

FIG. 5 shows the measurement taken by driving the vehicle at high-speed on an uneven road, with the engine put into neutral and maintained at 3000 rpm to permit the acquisition of a greater quantity of data.

This test serves to verify the effect of the uneven ground on the capacity of the algorithm to discriminate possible disturbances in the signal, due to the asperities of the road, from deliberate misfires.

As can be seen, all the misfires were detected, thereby demonstrating a high level of rejection, by the half-cycle algorithm, of measurement noise generated by the road. During measurement, partial misfires generated by the engine appeared, which the algorithm correctly rejected.

FIG. 6 shows a measurement taken in motion on the same section of road in second gear from 2800 to 4500 rpm.

The misfires are well discriminated notwithstanding the measurement noise from the road added to the oscillations of the transmission.

FIG. 7 confirms the reliability of the algorithm even in the presence of gear changes. Substantially similar results were obtained in the case of standard operation of the vehicle travelling on a flat road in 4th gear from 2800 to 4500 rpm.

It can be seen that the half-cycle (algorithm) always intervenes up to the moment of the gear change. At this instant the motor begins to decelerate and the injection duration (ET) reduces or is cancelled entirely by the operation of the CUT-OFF strategy. This situation is identified by the monitoring of the measured injection duration, which excludes the algorithm from the test to detect misfires when ET becomes less than ETmin (equal to 4 ms).

In particular conditions, for example for detection performed on a flat road in first gear, with the motor running at around 5500 rpm it happens that the considerable noise in the signal starts to be so great that it does not permit even visual discrimination of generated misfires. Likewise the half-cycle algorithm is not able to discriminate misfires correctly from the measurement noise.

Consequently, therefore, the algorithm is able to respond positively to all the standard use situations of the vehicle (flat road, rough road, gear changes), and the cylinder in which the misfire was detected is identified securely. In the most critical conditions (high engine speed and low load) where the signal-to-noise ratio is higher, the algorithm can present disadvantages, which suggests adding a further algorithm to the half-cycle algorithm (which will be denominated double-cycle) to recognise misfires even in the most serious situations.

Double-cycle algorithm

The uncertainties of the half-cycle algorithm in correctly detecting misfires were recognised in cases in which the motor works at high revolutions and low loads. In fact, in these situations, the difficulties in detection are due principally to:

the increase in the measurement noise due to the movement of the engine block;

the increase in the combustion dissymmetries between the various cylinders.

Taking into consideration these indications, the double-cycle algorithm, indicated $D_i$, was identified, which utilises the differences between $C_i$ (torque relating to the combustion "i") and $C_{i-4}$ (torque relating to the combustion "i-4"):

$$D_i = C_i - C_{i-4}$$

The term double-cycle makes reference to the fact that comparison is made between the torques measured on the same cylinder, that is to say every two engine revolutions (or 720°).

In the case of individual misfires (FIG. 8 a) and b)) the output $D_i$ always shows a negative peak immediately followed by a positive peak $D_{i+1}$.

The comparison of a cylinder with itself produces significant advantages such as:

the significant reduction of measurement noise;

elimination of systematic errors due to the dissymmetries of combustion between cylinders.

The application of the double-cycle algorithm is identical to that of the half-cycle algorithm. The peak-to-peak of the signal at instant "i" is calculated to give $PP4_i$:

$$P4n_i = C_i - C_{i-4} = D_i$$

$$P4p_i = C_{i+4} - C_i = D_{i+1}$$

$$PP4_i = P4p_i - P4n_i$$

where:

P4n=negative peak (beginning of misfire)

P4p=positive peak (end of misfire)

PP4=peak-to-peak of the double-cycle algorithm.

The identification of individual misfires (FIG. 9) takes place by comparing $PP4_i$ with the comparison threshold:

$$PP4_i > c4 \ast K \ast ET_i$$

The low level of noise present in this situation makes it possible to utilise a suitable value as the value of c4.

It is necessary to note that even for the double-cycle algorithm the monitoring of the injection duration, introduced for the half-cycle algorithm must be utilised.

Figure 11:
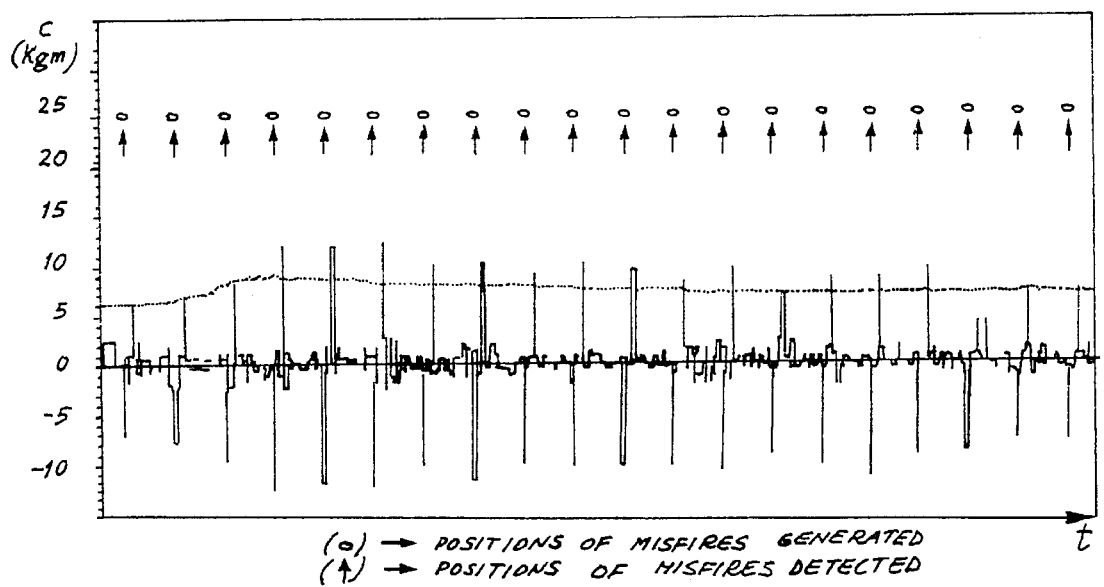
Figure 12A:
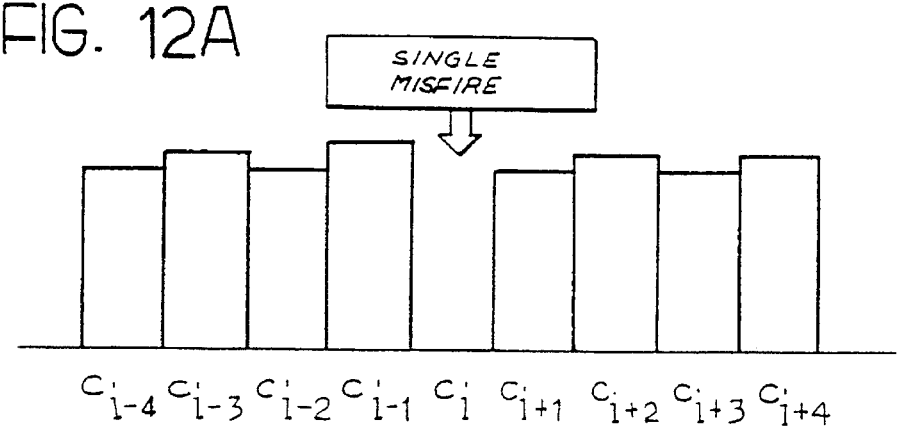
Figure 12B:
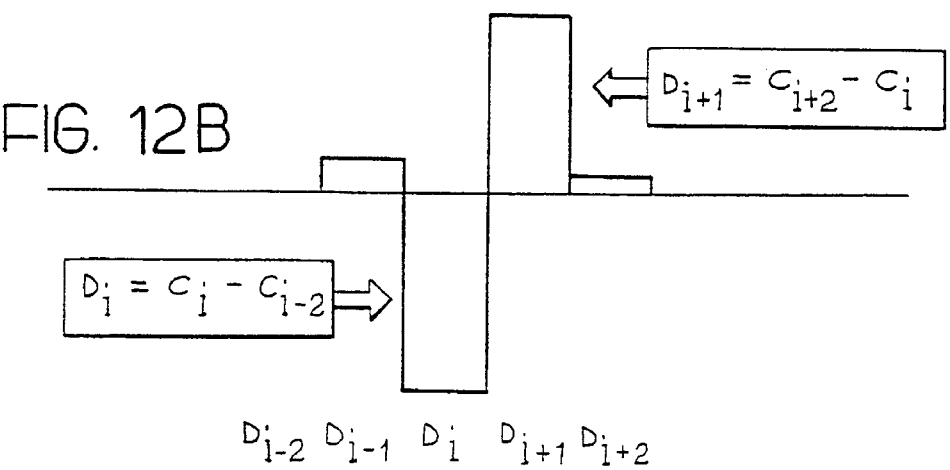
Figure 13:
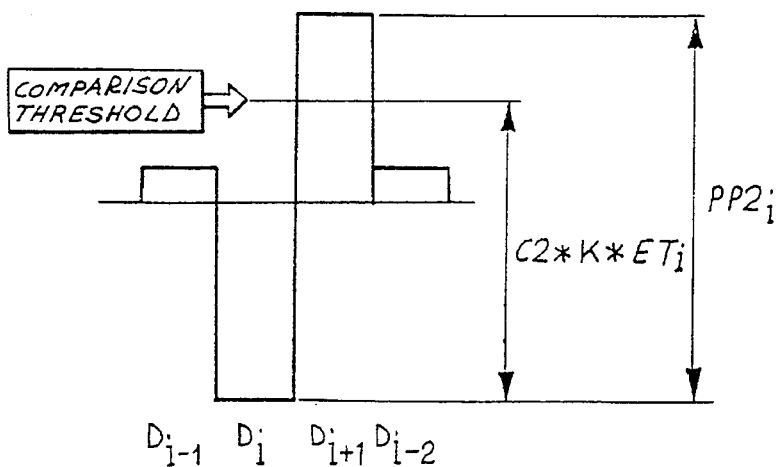

The double-cycle algorithm was validated by performing several experimental tests in the working conditions of the engine which put the half-cycle algorithm in difficulties. During each individual test one misfire was generated in cylinder number 1 every five engine cycles. The most significant measurements were made on a flat road in first gear with the engine choked around 5500 rpm (FIG. 10) and in transient conditions from 5000 to 5600 rpm (FIG. 11).

The quantities represented in the drawing are:

the output signal from the double-cycle algorithm (displayed as a continuous black line);

the comparison threshold (a continuous light line);

the positions of the generated misfires (each of which is indicated with a circle);

the positions of the misfires detected by the recognition algorithm (each identified misfire is represented by an arrow).

The figures clearly show how, with the operation of the double-cycle algorithm, it is possible to detect (even visually) which are the deliberate misfires. The noise of the signal, present in even the half-cycle signal, is significantly reduced thereby allowing an easy identification of the misfires which occur. It is noted that the half-cycle algorithm loses its efficacy with an increase in the engine speed beyond 5000 rpm in that the signal-to-noise ratio starts to get worse. The application of the double-cycle algorithm (FIGS. 10, 11) allows the level of the noise present to be reduced, thereby permitting detection of the occurrence of misfires.

Single-cycle algorithm

The two methods described for the detection of misfires still have some problems:

the half-cycle algorithm does not recognise two consecutive misfires (that is to say on two sequential cylinders in the firing order);

the double-cycle algorithm does not identify a permanently inactive cylinder.

To obviate these difficulties a further algorithm has been identified to put alongside the others, in which the value of $D_i$ is calculated as the difference between $C_i$ (torque relative to the $i^{th}$ combustion) and $C_{i-2}$ (the torque relating to combustion "i-2"):

$$D_i = C_i - C_{i-2}$$

This algorithm has been indicated with the term "single cycle" (FIGS. 12 a) and b)), with reference to the fact that the torques measured on one cylinder and on the opposite cylinder one engine revolution later (or 360°) are compared.

For the application of the single-cycle algorithm the peak-to-peak of the signal at the instant "i" is also calculated to give $PP2_i$:

$$P2n_i = C_i - C_{i-2} = D_i$$

$$P2p_i = C_{i+2} - C_i = D_{i+1}$$

$$PP2_i = P2p_i - P2n_i$$

where:

P2n=negative peak (beginning of misfire)

P2p=positive peak (end of misfire)

PP2=peak-to-peak of the single cycle algorithm.

Identification of an individual misfire (FIG. 13) is, in this case, too, achieved by testing $PP2_i$ against the comparison threshold:

$$PP2_i > c2*K*ET_i$$

The single-cycle algorithm has a greater noise level than the double-cycle algorithm so that it is necessary to use a suitable value of c2 where appropriate. For this algorithm, too, the threshold is proportional to the injection duration.

Experimental tests on the single-cycle algorithm have been performed in conditions in which the two main algorithms are not satisfactory.

Figure 14:
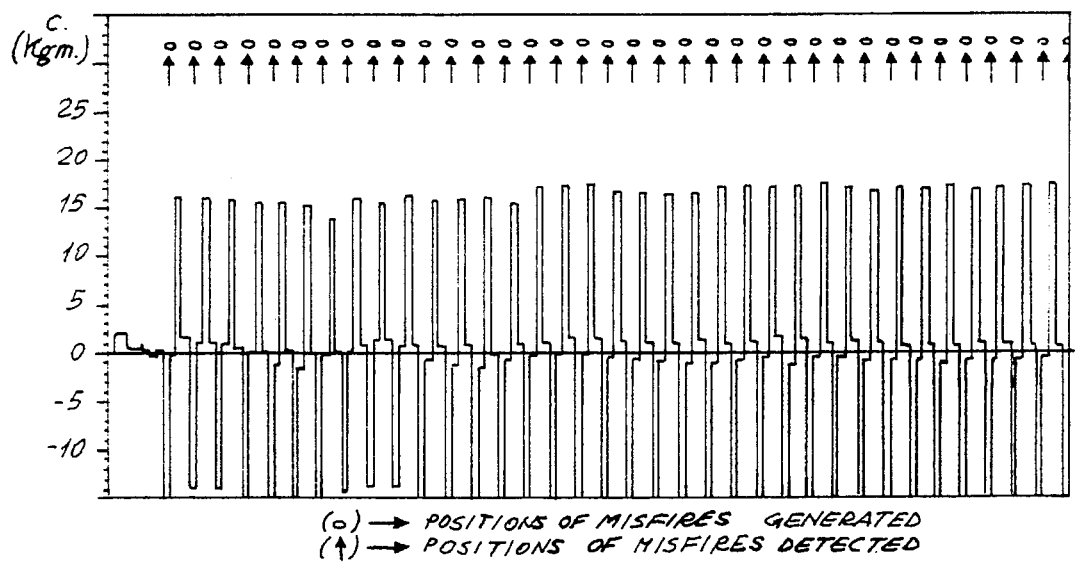

FIG. 14 shows a measurement taken on a flat road in second gear at 4000 rpm with the injection of cylinder number 1 interrupted during the whole of the test.

In this case, where the double-cycle algorithm gets into difficulties, the single-cycle algorithm intervenes thereby permitting a secure and correct detection of the misfires.

Figure 15:
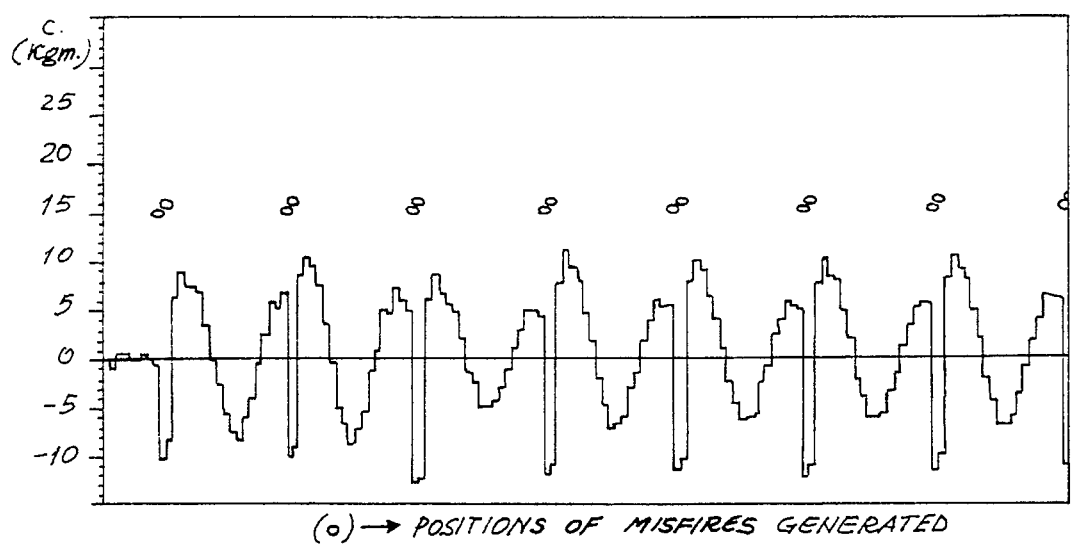

FIG. 15 shows a measurement taken on a flat road travelling in 4th gear from 2500 to 3500 rpm with misfires generated every five engines cycles on cylinder number 1 and on cylinder number 3.

This particular measurement condition makes it possible to demonstrate the validity of the single-cycle algorithm in identifying two consecutive misfires, thereby confirming the ineffectiveness of the half-cycle algorithm in this situation.

Applications of the recognition algorithms

The search for a method to identify misfires has lead to the identification and validation of three algorithms.

half-cycle: for situations of standard use of the vehicle (low motor speed, flat or bumpy road, in motion, choked or changing gear);

double-cycle: for more critical conditions of use (high engine speed, low load . . . );

single-cycle: for operation in cases in which the half and double-cycle fail.

In reality it is more correct to speak of two "pairs of algorithms" in that the single-cycle algorithm is allied to both the half- and double-cycle algorithm. In this way two separate "configurations" are obtained from the working conditions of the engine:

configuration 1 (standard conditions) half-cycle and single-cycle configuration 2 (critical conditions) double-cycle and single-cycle It is apparent that the effectiveness of the detection of misfires in all working situations with the vehicle in motion is determined by the integration of the two configurations into a single structure.

In order to do this it is necessary to identify a process which establishes when to change the "pair of algorithms" if the operating conditions of the engine change.

The method identified takes into consideration:
the speed of the engine, detected at the instant in which the measurement MDC/CC is performed and an engine speed threshold (Velomax) which allows the tests to be activated on one of the two configurations.

Velomax is identified in an experimental way, for example with a dynamic torque detection cycle in free acceleration (see, for example, Italian patent 1 180 045) and is detected at the point at which the dissymmetries of combustion between the various cylinders and the vibrational noise increase the measured signal noise. An experimental value of Velomax which has been shown to be particularly advantageous is situated around 4500 rpm.

This means that, by the nature of the "two pairs of algorithms":

if the motor speed is less than Velomax we are in configuration 1 test conditions: half-cycle algorithm:

$$PP1_i > c1*K*ET_i$$

and the single-cycle algorithm, which is able to detect the presence of two consecutive misfires:

$$PP2_i > c2*K*ET_i$$

if the motor speed is greater than or equal to Velomax, then configuration 2 is used for the test: double-cycle algorithm:

$$PP4_i > c4*K*ET_i$$

and the single-cycle algorithm, if we are in the presence of an inactive cylinder or of at least two consecutive misfires again in the same cylinder:

$$PP2_i > c2*K*ET_i$$

This procedure allows integration of the algorithms for the detection of the misfires in-to a single structure, allowing the changeover of the test configuration on the basis of the variation of engine speed.

The integrated algorithms for detection of misfires have been validated with a series of experimental tests made in different working conditions of the vehicle and the engine. The tests were conducted with the same measurement equipment used in the tests of the individual algorithms. Information on the tests conducted and the results obtained have been collected in two tables appearing in the following.

Table 1 records general information on the individual tests:
measurement conditions
reference index for each test (number);
type of terrain (off road or flat asphalt road);
gear engaged;
engine revolutions;
type of test: PP=full power with butterfly valve completely open PZ=throttled with butterfly valve open 50%

TR=velocity transient.

Generated misfires cylinder(s): indicates the cylinder or cylinders in which the misfires were generated;

rate: indicates the frequency with which generated misfires are repeated (1×1 cycle=every engine cycle, 1×5 cycles=every five engine cycles).

Table 2 records the results obtained for each detection as:
the reference index of the measurement;
the number of generated misfires and the cylinder or cylinders involved (CYL1,2,3,4=cylinder 1,2,3,4);
the number of misfires detected by the integrated algorithms and the cylinder or cylinders involved.

TABLE 1

| | General Information | | |
|---|---|---|---|
| No. | Measurement Conditions | Generated Misfires Cylinder (s) | Rate |
| 00 | Loose earth in neutral at 3000 rpm | Cylinder 1 | 1 × 5 cycles |
| 01 | Loose earth in neutral at 3000 rpm | Cylinders 1 & 3 | 1 × 5 cycles |

TABLE 1-continued

General Information

| No. | Measurement Conditions | Generated Misfires Cylinder (s) | Rate |
|---|---|---|---|
| 02 | Loose earth PP in second gear from 2800 to 4500 rpm | Cylinder 1 | 1 × 5 cycles |
| 03 | Loose earth PP in second gear from 2800 to 4500 rpm | Cylinders 1 & 3 | 1 × 5 cycles |
| 04 | Road, in neutral at 3000 rpm | Cylinder 1 | 1 × 5 cycles |
| 05 | Road, in neutral at 3000 rpm | Cylinders 1 & 3 | 1 × 5 cycles |
| 06 | Road, PP in second gear from 2800 to 4500 rpm | Cylinder 1 | 1 × 5 cycles |
| 07 | Road, PP in second gear from 2800 to 4500 rpm | Cylinders 1 & 3 | 1 × 5 cycles |
| 08 | Road, PZ in second gear at 3000 rpm | Cylinder 1 | 1 × 5 cycles |
| 09 | Road, PZ in second gear at 3000 rpm | Cyliniders 1 & 3 | 1 × 5 cycles |
| 10 | Road, PP in fourth gear from 2800 to 5000 rpm | Cylinder 1 | 1 × 5 cycles |
| 11 | Road, PP in fourth gear from 2800 to 5000 rpm | Cylinders 1 & 3 | 1 × 5 cycles |
| 12 | Road, PZ in fourth gear at 3000 rpm | Cylinder 1 | 1 × 5 cycles |
| 13 | Road, PZ in fourth gear at 3000 rpm | Cylinders 1 & 3 | 1 × 5 cycles |
| 14 | Road, PP in fifth gear from 3800 to 4500 rpm | Cylinder 1 | 1 × 5 cycles |
| 15 | Road, with gear changes (i, ii, iii, iv) | Cylinder 1 | 1 × 1 cycle |
| 16 | Road, with gear changes (i, ii, iii, iv) | without misfiring | |

TABLE 2

Comparison between generated and detected misfires

| | GENERATED MISFIRES | | | | DETECTED MISFIRES | | | |
|---|---|---|---|---|---|---|---|---|
| n | CIL1 | CIL3 | CIL4 | CIL2 | CIL1 | CIL3 | CIL4 | CIL2 |
| 00 | 20 | 0 | 0 | 0 | 20 | 0 | 0 | 1 |
| 01 | 19 | 19 | 0 | 0 | 19 | 19 | 0 | 0 |
| 02 | 20 | 0 | 0 | 0 | 20 | 0 | 0 | 0 |
| 03 | 20 | 20 | 0 | 0 | 20 | 20 | 0 | 0 |
| 04 | 17 | 0 | 0 | 0 | 17 | 0 | 0 | 0 |
| 05 | 19 | 18 | 0 | 0 | 19 | 18 | 0 | 0 |
| 06 | 20 | 0 | 0 | 0 | 20 | 0 | 0 | 0 |
| 07 | 20 | 20 | 0 | 0 | 20 | 20 | 0 | 0 |
| 08 | 20 | 0 | 0 | 0 | 20 | 0 | 0 | 0 |
| 09 | 20 | 20 | 0 | 0 | 20 | 20 | 0 | 0 |
| 10 | 17 | 0 | 0 | 0 | 17 | 0 | 0 | 0 |
| 11 | 20 | 20 | 0 | 0 | 20 | 20 | 0 | 0 |
| 12 | 20 | 0 | 0 | 0 | 20 | 0 | 0 | 0 |
| 13 | 20 | 20 | 0 | 0 | 20 | 20 | 0 | 0 |
| 14 | 20 | 0 | 0 | 0 | 20 | 0 | 0 | 0 |
| 15 | 55 | 0 | 0 | 0 | 55 | 0 | 0 | 0 |
| 16 | 0 | 0 | 0 | 0 | 0 | 1 | 0 | 0 |

The experimental validation undertaken has shown:

1 the effectiveness of the integrated algorithms in correctly detecting the generated misfires and the cylinder or cylinders involved;

2 the validity of the identified procedure (use of Velomax threshold) for changing the configuration of algorithms for testing upon variation of the surrounding conditions (type of ground, engine load, . . . ).

As can be seen from Table 2 the results obtained are more than satisfactory. All the misfires generated during every individual test were identified by the integrated algorithms.

In particular cases, such as detection number 00 and number 16 the further misfires detected really existed in that they were caused by the engine.

The detection of misfires as in this latter unexpected case, confirms further the capacity of the integrated algorithms to identify the occurrence of misfires.

Notwithstanding having operated in the most critical situation for reading the angular velocity, that is with a pulley having four teeth (and therefore with a fixed angular window at 90°), no critical states were evident in the application of the methodology.

It is important to underline that if one were to have available a phonic wheel with more teeth or if one were to be able to position the references with freedom, one would have the possibility of optimising the angular basis for measurement and the phase with respect to TDC, thereby improving the misfire detection performance.

The recognition algorithms were validated both in what may be considered as normal operating conditions of the vehicle and those made artificially difficult, that is to say those which in practice would not ever occur.

The algorithms for the detection of misfires were implemented in the electronic central control unit K by modifying only the software present without any problems for the other existing functions.

What is claimed is:

1. A process for detecting misfires in an internal combustion engine comprising the steps of:

detecting an indicated torque value for each expected combustion of the engine, and generating a sequence of said indicated torque values corresponding to said expected combustions, generating a cycle signal by combining at least two successive values of said sequence of indicated torque values, determining a peak value of said cycle signal, determining a threshold value corresponding to an expected torque of the engine in the presence of effective combustion, and comparing said peak value with said threshold value and evaluating whether said peak value differs from said threshold value so as to identify a misfire of said engine.

2. A process according to claim 1, wherein said cycle signal is generated as the difference between two successive values of said sequence of indicated torque values.

3. A process according to claim 1, wherein said peak value is determined as a peak-to-peak value of the said cycle signal.

4. A process according to claim 1 applied to an internal combustion engine in which an injection of fuel into each cylinder takes place with a predetermined duration, wherein said comparison threshold is chosen as a function of said injection duration.

5. A process according to claim 4, wherein said comparison threshold is chosen to be proportional, with a constant of proportionality, to said injection duration.

6. A process according to claim 5, wherein the constant of proportionality between the comparison threshold and the said injection duration is determined as a function of the ratio between the maximum value of the mean indicated torque of the engine cylinders and the maximum value of the injection duration with the engine at full power.

7. A process according to claim 5 further including the steps of detecting, during performance of the process, the value of the said injection duration, and inhibiting the detection of misfires when said injection duration falls below a minimum value.

8. A process according to claim 5, further including the step of modulating the value of the said constant of proportionality with a further constant of proportionality in dependence on the choice of the said two successive values in the sequence.

9. A process according to claim 1, wherein starting from said at least two successive values of the said sequence, there is generated at least one of the three following cycle signals:
   a first cycle signal in which two said successive values of the said sequence are chosen as values corresponding to consecutive expected combustions on the cylinders seen in firing order,
   a second cycle signal, in which the said successive values of the said sequence are chosen as corresponding to two consecutive and expected combustions on the same cylinder;
   a third cycle signal in which the said two successive values of the said sequence are chosen as corresponding to expected consecutive combustions on one cylinder and on the opposite cylinder one engine revolution later.

10. A process according to claim 8 or claim 9, wherein said further constant of proportionality is chosen in a manner which is different according as the said first, the said second or the said third cycle signal is determined.

11. A process according to claim 10; wherein values for the said further constant of proportionality are chosen according to whether the said first, the said second or the said third cycle signal is determined, which stand in relation to one another in relative ratios characteristic of each type of engine.

12. A process according to claim 9, including the steps of simultaneously generating at least two of the said first, said second and said third cycle signal, determining a respective peak value for the said at least two cycle signals generated by comparing the peak values thus generated with respective threshold values, thereby simultaneously effecting two misfire detection operations.

13. A process according to claim 9 including the steps of detecting the speed of rotation of the engine, then comparing the speed of rotation of the engine with a reference threshold (Velomax), then generating a first and a second pair of said cycle signals according as the speed of rotation of the engine is less or greater than the said reference threshold.

14. A process according to claim 13, wherein said reference threshold (Velomax) is chosen to be in the region of about 4500 revolutions per minute.

15. A process according to claim 13 wherein the first pair of cycle signals comprises the said first and the said second cycle signal whilst the said second pair of cycle signals comprises the said second and the said third cycle signal.

16. A process according to claim 1, performed with the said engine mounted on a vehicle, with the engine itself operating whilst the vehicle is travelling.

17. A system for detecting misfires in an internal combustion engine, said system including:
   first sensor means for detecting an instantaneous speed and phase of rotation of said engine, passage of engine cylinders through a top dead center position and a duration of fuel injection into the cylinders of the engine,
   processor means for determining from the engine speed signal, for each expected combustion a value of an indicated torque of the engine, thus generating a corresponding sequence of values; wherein said processor means generates as a combination of at least two successive values of said sequence, a cycle signal, determines a peak value of said cycle signal, and determines a threshold value corresponding to the expected torque of the engine in the presence of effective combustion; and compares said peak value with said threshold value and determines whether said peak value differs from said threshold value so as to indicate a misfire of the engine, and
   display means controlled by said processor means to present the result of said comparisons and determining whether said peak value differs from said threshold value so as to identify a misfire of said engine.

18. A system according to claim 17, wherein the said first sensor means generate a further signal indicative of the duration of the time interval for which fuel is injected into the engine cylinders and in that the said processor means are programmed to calculate, the said comparison threshold from the said injection duration signal.

* * * * *